US008537760B2

(12) United States Patent
Tee et al.

(10) Patent No.: US 8,537,760 B2
(45) Date of Patent: Sep. 17, 2013

(54) METHOD AND SYSTEM FOR DYNAMIC HYBRID MULTIPLE ACCESS IN AN OFDM-BASED WIRELESS NETWORK

(75) Inventors: Lai King Tee, Dallas, TX (US); Cornelius van Rensburg, Dallas, TX (US); Jiann-An Tsai, Richardson, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 1694 days.

(21) Appl. No.: 11/267,584

(22) Filed: Nov. 4, 2005

(65) Prior Publication Data

US 2006/0135075 A1  Jun. 22, 2006

Related U.S. Application Data

(60) Provisional application No. 60/636,915, filed on Dec. 17, 2004.

(51) Int. Cl.
*H04W 4/00* (2009.01)

(52) U.S. Cl.
USPC ........... 370/329; 370/322; 370/341; 370/348; 370/431; 370/443; 455/450; 455/451; 455/452.1; 455/464; 455/509

(58) Field of Classification Search
USPC ................. 370/437, 342, 322, 329, 341, 348, 370/431, 443; 455/450, 451, 452.1, 464, 455/509
See application file for complete search history.

(56) References Cited

U.S. PATENT DOCUMENTS

| | | | |
|---|---|---|---|
| 6,473,418 B1 | 10/2002 | Laroia et al. | |
| 6,553,019 B1 | 4/2003 | Laroia et al. | |
| 6,711,120 B1 | 3/2004 | Laroia et al. | |
| 7,016,651 B1* | 3/2006 | Narasimhan | 455/67.11 |
| 7,139,304 B2* | 11/2006 | Jou | 375/147 |
| 2004/0259561 A1* | 12/2004 | Stewart et al. | 455/452.2 |
| 2005/0096061 A1 | 5/2005 | Ji et al. | |
| 2005/0207385 A1 | 9/2005 | Gorokhov et al. | |
| 2005/0245258 A1* | 11/2005 | Classon et al. | 455/434 |
| 2005/0286547 A1* | 12/2005 | Baum et al. | 370/437 |
| 2006/0198292 A1* | 9/2006 | Yoshii et al. | 370/208 |
| 2006/0233147 A1* | 10/2006 | Karabinis | 370/342 |

FOREIGN PATENT DOCUMENTS

| | | |
|---|---|---|
| GB | 2 318 252 A | 4/1998 |
| WO | WO 01/26236 A1 | 4/2001 |
| WO | WO 02/43328 A2 | 5/2002 |
| WO | WO 2004/038972 A1 | 5/2004 |

* cited by examiner

*Primary Examiner* — Wayne Cai (57) ABSTRACT

A method of dynamic hybrid multiple access in a wireless network that comprises a plurality of subscriber stations is provided. The method includes selecting a sub-carrier status for each of the subscriber stations based on at least one predetermined condition for the subscriber station. The sub-carrier status is either hopping or scheduled. The predetermined condition is monitored for each subscriber station to determine whether to switch the sub-carrier status for the subscriber station based on a change in the predetermined condition.

22 Claims, 4 Drawing Sheets

METHOD AND SYSTEM FOR DYNAMIC HYBRID MULTIPLE ACCESS IN AN OFDM-BASED WIRELESS NETWORK

CROSS-REFERENCE TO RELATED APPLICATION AND CLAIM OF PRIORITY

The present disclosure is related to that disclosed in U.S. Provisional Patent No. 60/636,915, filed Dec. 17, 2004, entitled "Apparatus and Method Using OFDMA with Same Frequency Reuse in a Wireless Network." U.S. Provisional Patent No. 60/636,915 is assigned to the assignee of the present application. The subject matter disclosed in U.S. Provisional Patent No. 60/636,915 is hereby incorporated by reference into the present disclosure as if fully set forth herein. The present application hereby claims priority under 35 U.S.C. §119(e) to U.S. Provisional Patent No. 60/636,915.

TECHNICAL FIELD OF THE INVENTION

The present disclosure relates generally to wireless communications and, more specifically, to a method and system for dynamic hybrid multiple access in an orthogonal frequency division multiplexing (OFDM) based wireless network.

BACKGROUND OF THE INVENTION

Businesses and consumers use a wide variety of fixed and mobile wireless terminals, including cell phones, pagers, Personal Communication Services (PCS) systems, and fixed wireless access devices (e.g., vending machines with cellular capability). Wireless service providers continually try to create new markets for wireless devices and expand existing markets by making wireless devices and services less expensive and more reliable. To attract new customers, wireless service providers implement new services, especially digital data services that, for example, enable a user to browse the Internet or send and receive e-mail.

To support these new services, existing wireless protocols are being improved and new wireless protocols are being developed in order to provide the high data rates required by the new services. However, many of these wireless protocols suffer from significant drawbacks that limit data throughput.

Therefore, there is a need in the art for an improved wireless network protocol and an efficient air interface technology. In particular, there is a need for a method of dynamic hybrid multiple access in an OFDM-based wireless network.

SUMMARY OF THE INVENTION

A method and a system for dynamic hybrid multiple access in an OFDM-based wireless network are provided. According to an advantageous embodiment of the present disclosure, the method includes selecting a sub-carrier status for a subscriber station based on at least one predetermined condition for the subscriber station. The sub-carrier status is either hopping or scheduled (non-hopping). The predetermined condition is monitored for the subscriber station to determine whether to switch the sub-carrier status for the subscriber station based on a change in the predetermined condition.

According to one embodiment of the present disclosure, the at least one predetermined condition comprises an indicated carrier-to-interference (C/I) ratio and a rate of change for the indicated C/I ratio.

According to another embodiment of the present disclosure, the sub-carrier status is selected for the subscriber station by selecting non-hopping (or scheduling based) for the subscriber station when the subscriber station has (i) an indicated C/I ratio greater than a first C/I threshold or (ii) a rate of change for the indicated C/I ratio less than a first C/I rate of change threshold. A sub-carrier status of hopping is selected for the subscriber station when the subscriber station has (i) an indicated C/I ratio less than a second C/I threshold or (ii) a rate of change for the indicated C/I ratio greater than a second C/I rate of change threshold.

According to still another embodiment of the present disclosure, the method also includes receiving from the subscriber station indications of a plurality of C/I ratios at a specified rate, the indicated C/I ratios based on the measurements and estimations of the C/I ratios by the subscriber stations, and calculating the rate of change for the indicated C/I ratios based on the received indications of C/I ratios.

According to yet another embodiment of the present disclosure, the method also includes allocating at least one sub-channel to a non-hopping subscriber station and assigning a hopping sequence to a hopping subscriber station.

According to a further embodiment of the present disclosure, the method also includes creating the sub-channels using an aggregated structure, wherein the sub-carriers of a sub-channel are all adjacent to other sub-carriers of the sub-channel.

According to a still further embodiment of the present disclosure, the method also includes creating the sub-channels using a distributed structure, wherein some of the sub-carriers of a first sub-channel are interleaved with sub-carriers of at least a second sub-channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
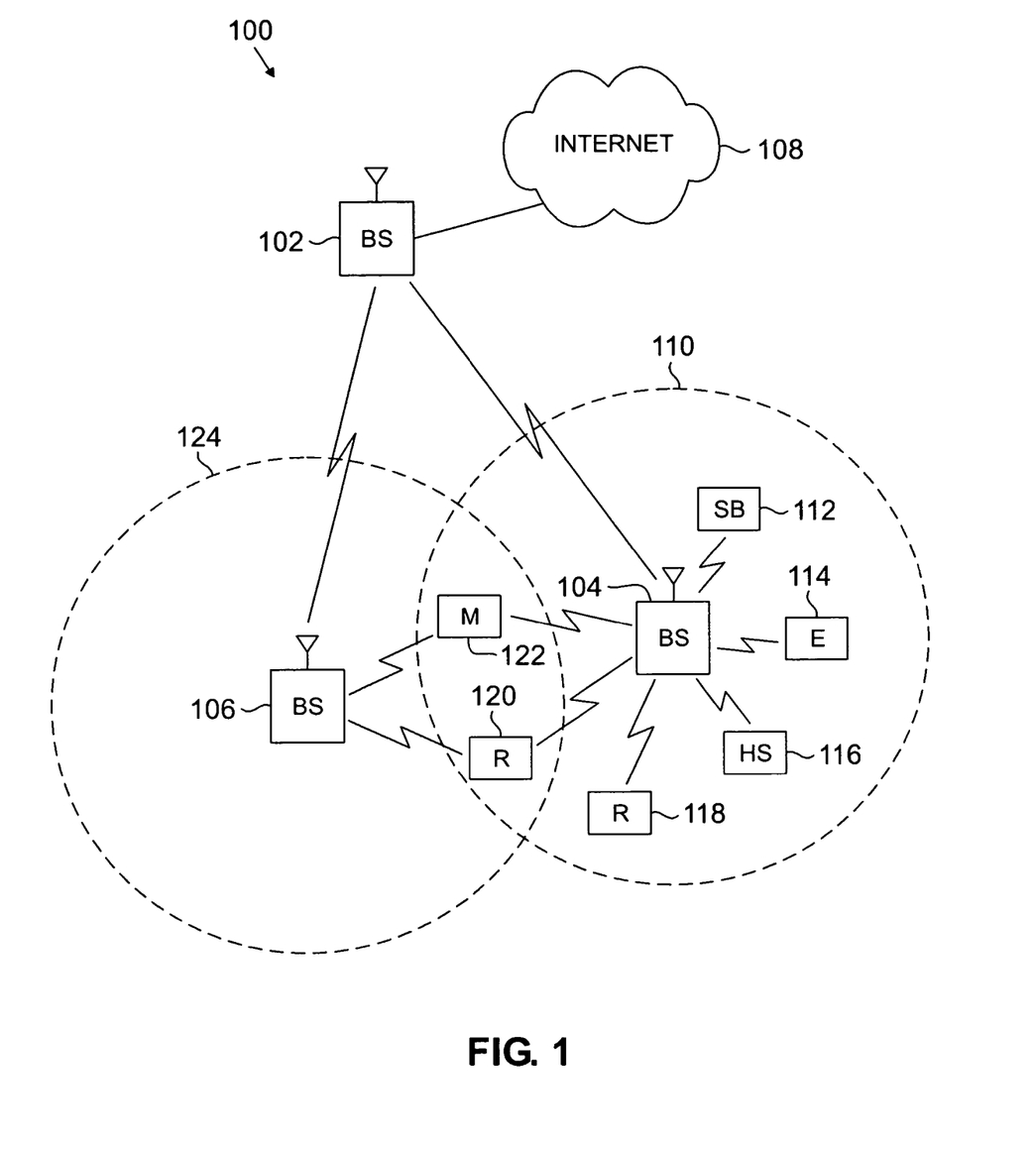
FIG. 1 illustrates an exemplary wireless network that is capable of providing dynamic hybrid multiple access in an orthogonal frequency division multiplexing (OFDM) based wireless network according to an embodiment of the present disclosure.
Figure 2A:
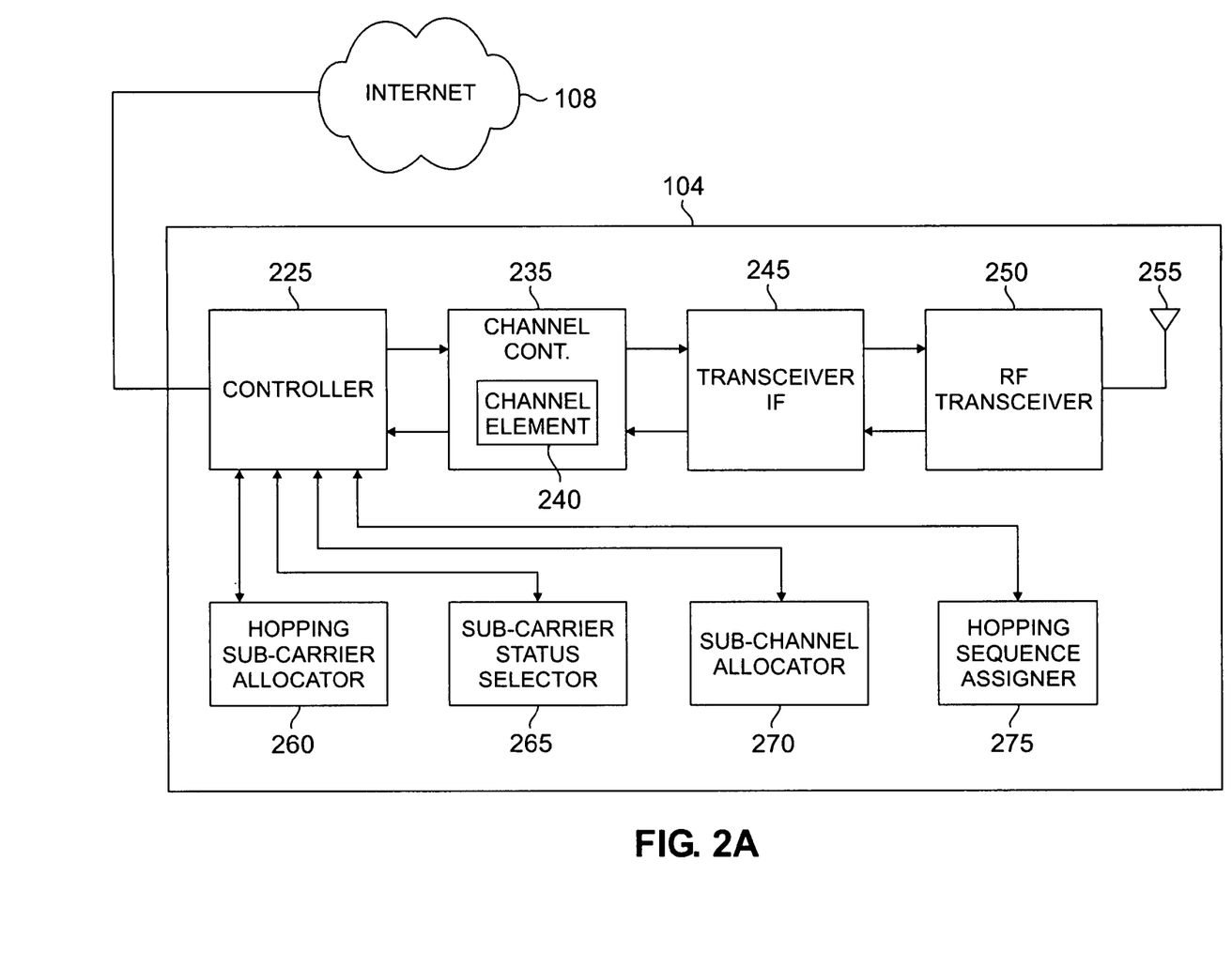
FIG. 2A illustrates an exemplary base station that is capable of providing dynamic hybrid multiple access in an OFDM-based wireless network according to an embodiment of the present disclosure.
Figure 2B:
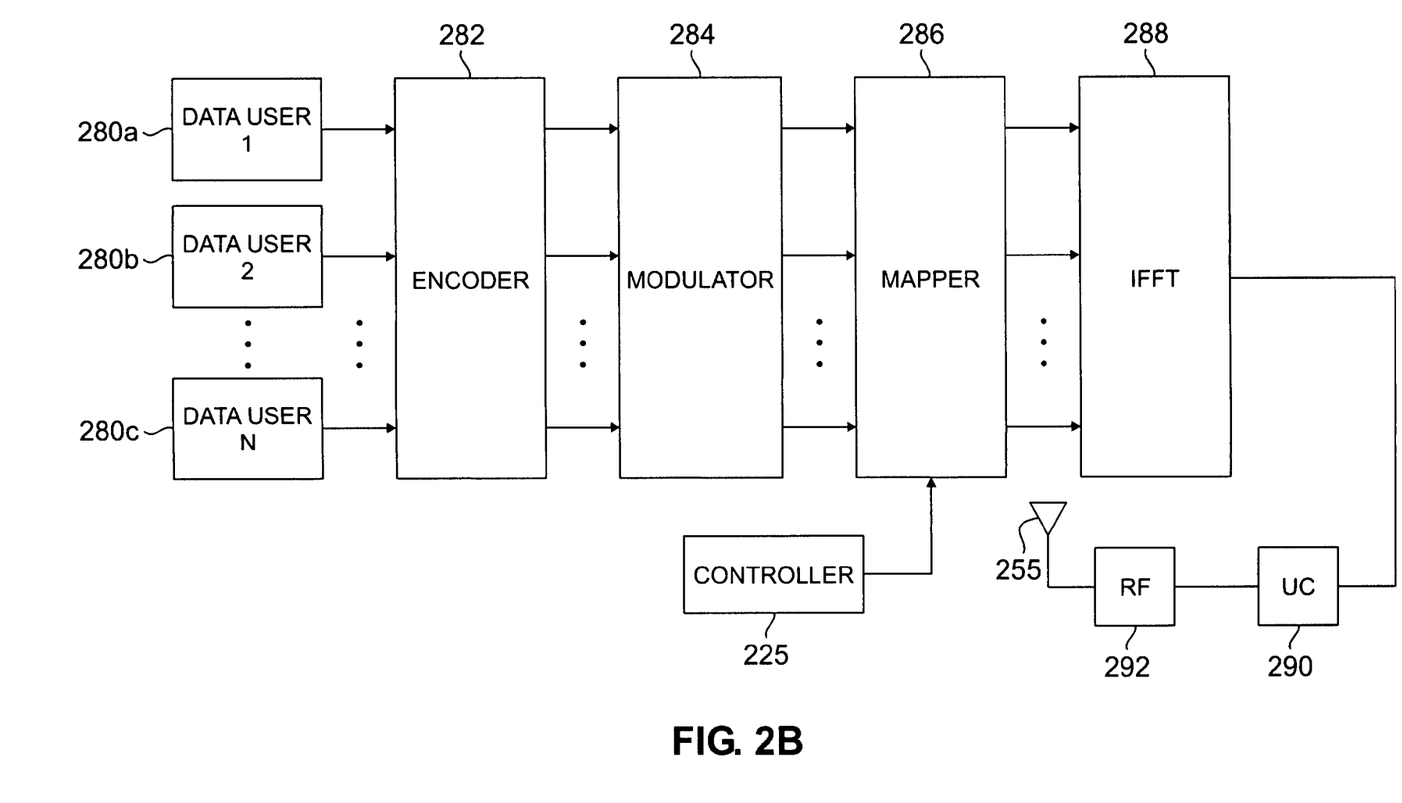
FIG. 2B illustrates a portion of an exemplary base station transmitter that is operable to provide dynamic hybrid multiple access in an OFDM-based wireless network according to an embodiment of the present disclosure.
Figure 3:
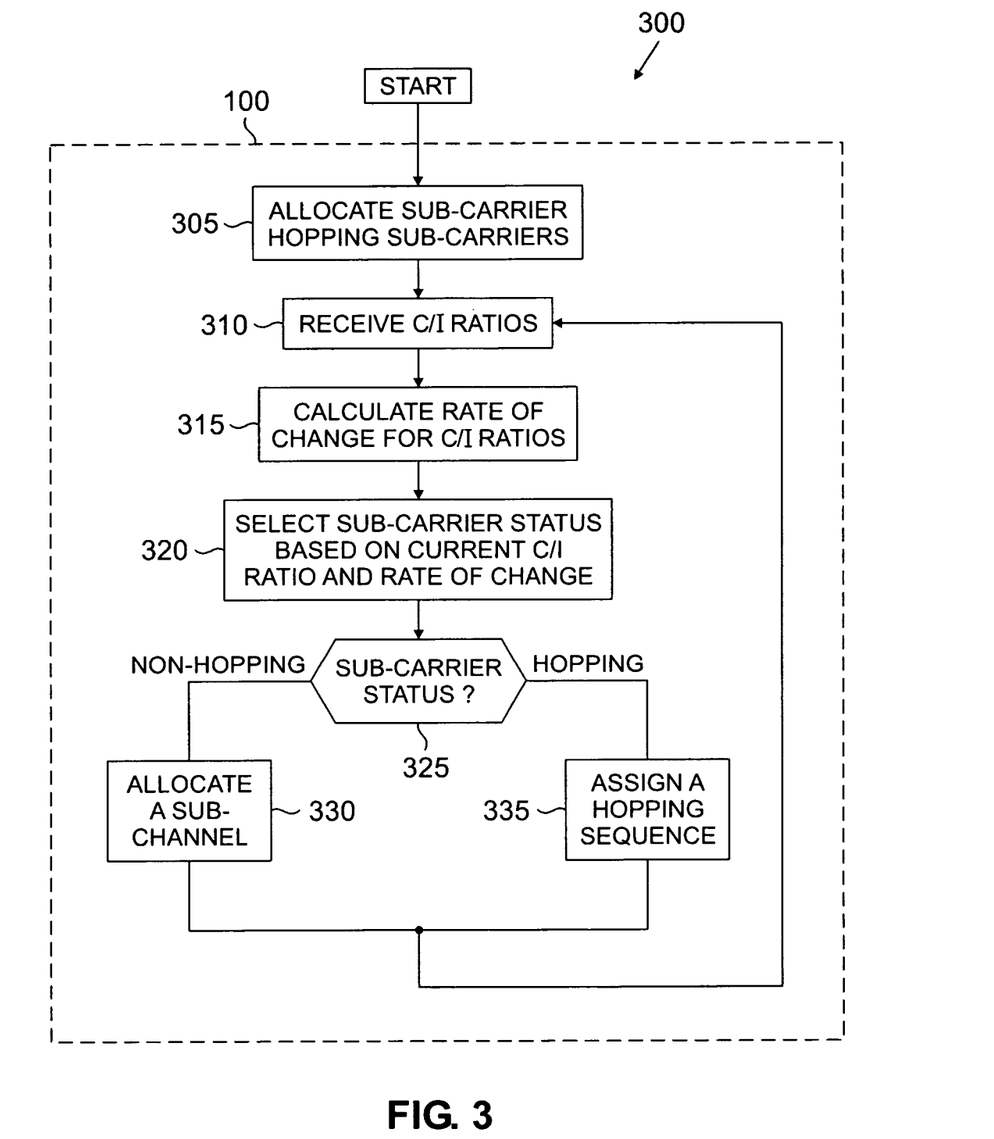
FIG. 3 is a flow diagram illustrating a method for providing dynamic hybrid multiple access in an OFDM-based wireless network using the base station of FIG. 2A according to an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Some cellular systems based on OFDM signaling methods, such as the Flash orthogonal frequency division multiplexing (Flash-OFDM), use frequency hopping to reduce inter-cell interference to mobile stations in the adjacent cells within the coverage area of the Flash-OFDM wireless network. However, the highest possible data rates for users experiencing good channel conditions are unnecessarily limited because the Flash-OFDMA protocol is not optimized for such users with respect to the overall system. For example, if mobile station A is close to a base station, there may be negligible inter-cell interference. In such a case, it is not necessary to use frequency hopping for mobile station A. Instead, additional bandwidth may be allocated to mobile station A with less power required. Thus, although the same sub-channel may be allocated to two different subscriber stations in adjacent cells, a subscriber station may not need to have maximum power for each transmission.

Also, the effect of interference in a Flash-OFDM system is not significantly reduced in a slow hopping system. For example, when a symbol is transmitted using a first frequency that also is used in an adjacent cell, the symbol may be lost completely. This may happen if both cells are heavily loaded and each base station is transmitting at maximum power to subscriber stations located near the cell boundaries, using the same frequency. Furthermore, the predetermined segment structure of the Flash-OFDM protocol reduces optimality and flexibility in resource allocation.

In an IEEE-802.16e wireless network, several possible usages of sub-channels have been defined in the standard. The base station may schedule a transmission based on some parameters, such as the channel quality indicator, the amount of data traffic, and the service classes for a specific mobile station. However, the IEEE-802.16e standard does not currently specify any predetermined pattern of frequency hopping in the channel usage. Thus, the performance of an IEEE-802.16e wireless network may be limited by inter-cell interference.

The following disclosure describes a dynamic hybrid access system for an orthogonal frequency division multiplexing wireless network that builds on the above insights. More specifically, one or more of the described embodiments provide for combining the techniques of sub-carrier hopping and non-hopping sub-carrier communications in an OFDM communication mechanism whereby interference resistance is obtained for those subscriber stations that benefit from it, perhaps at the expense of diminished data rates, while other subscriber data stations that do not need high interference resistance can benefit from higher data rates.

FIG. 1 illustrates an exemplary wireless network 100 that is suitable for providing dynamic hybrid multiple access in an orthogonal frequency division multiplexing (OFDM) based wireless network according to the several embodiments of the present disclosure. In an embodiment, the wireless network 100 includes a first base station 102 that is in communication with a second base station 104 and a third base station 106. Base station 102 is in communication with an Internet 108 or other data network (not shown). Base station 104 provides wireless broadband access to Internet 108, via base station 102, to a plurality of subscriber stations (SSs) within a coverage area 110 of base station 104 including a first SS 112 in a small business, a second SS 114 in an enterprise, a third SS 116 in a WiFi hotspot, a fourth SS 118 in a first residence, a fifth SS 120 in a second residence, and a sixth SS 122 in a mobile device. Base station 106 provides wireless broadband access to Internet 108, via base station 102, to a plurality of SSs within a coverage area 124 of base station 106 including the fifth SS 120 and the sixth SS 122. In other embodiments, base station 102 may be in communication with a grater or lesser number of base stations. Additionally, while only six SSs have been depicted in FIG. 1, it is understood that in an embodiment the wireless network 100 may be expected to provide wireless broadband access to other subscriber stations. In an alternate embodiment, multiple base stations can be connected to the Internet.

It is noted that SS 120 and SS 122, associated with the second residence and the mobile device, respectively, are on the edge of the two coverage areas 110 and 124. SS 120 and SS 122 each communicate with both base station 104 and base station 106 and may be said to be operating in handoff. The concept of wireless handoff was developed to describe the need in cellular mobile phone networks to maintain voice calls as a cell phone passes into and out of possibly several different cell areas. In a break-before-make or hard handoff, a first communication link with the cell phone supported by a first cell would be taken down before a second communication link with the cell phone supported by a second cell would be established. In a make-before-break or soft handoff, the first communication link with the cell phone supported by the first cell would remain until after the second communication link with the cell phone supported by the second cell would be established, such that for a transient time both the first and second communication link were active concurrently and the cell phone was in communication concurrently with both the first and the second cell. Subscriber station (SS) 122, associated with the mobile device, may be in handoff for a transient period of time as SS 122 transits the overlap of the two coverage areas 110 and 124, for example, as a vehicle housing a wireless-enabled laptop computer drives along a road. Subscriber station (SS) 120, associated with the second residence, however, may remain in the handoff region for an indefinitely long period of time, for example, from ten minutes to a plurality of weeks.

In an embodiment, the base stations 102, 104, and 106 may communicate with each other and with the SSs 112, 114, 116, 118, 120, 122 using an IEEE-802.16, an IEEE-802.11, or an IEEE-802.20 wireless metropolitan area network standard, such as, for example, an IEEE-802.16e standard. In another embodiment, however, a different wireless protocol may be employed, for example, a HIPERMAN wireless metropolitan area network standard. Base station 102 may communicate through either direct line-of-sight or non-line-of-sight with base station 104 and base station 106, depending on the type of transmission technology used. Base station 104 and base station 106 may each communicate through non-line-of-sight with subscriber stations 112, 114, 116, 118, 120, and 122 using orthogonal frequency division multiplexing techniques.

Base station 104 may provide a T1 level service to SS 114 associated with the enterprise and a fractional T1 level service to SS 112 associated with the small business. Base station 104 may provide wireless backhaul for SS 116 associated with the WiFi hotspot, which may be located in an airport, café, hotel, or college campus. Base station 104 may provide digital subscriber line (DSL) level service to subscriber stations 118, 120 and 122. Subscriber stations 112, 114, 116, 118, 120, and 122 may use the broadband access to the Internet 108 to access voice, data, video, video teleconferencing, and/or other broadband services. In an embodiment, one or more of subscriber stations 112, 114, 116, 118, 120 and 122 may be associated with an access point (AP) of a WiFi WLAN. SS 122 may include any of a number of mobile devices including a wireless-enabled laptop computer, personal data assistant, notebook, handheld device, or other wireless-enabled device. Subscriber stations 118 and 120 may include a wireless-enabled personal computer, laptop computer, gateway, or other device.

The communication in network 100 generally takes place in accordance with the principles of orthogonal frequency division multiplexing (OFDM). As described in more detail below, each one of subscriber stations 112, 114, 116, 118, 120, and 122 may be given a hopping sub-carrier status or a non-hopping sub-carrier scheduling status by the base station, for example base station 104 and base station 106. In some contexts, hopping sub-carrier status may be referred to as hopping status and sub-carrier scheduling status may be referred to as non-hopping status. Subscriber stations 112-122 that are given a sub-carrier scheduling status are allocated a particular sub-channel for communication, the sub-channel comprising one or more sub-carriers. A first subscriber station operating in a sub-carrier scheduling operational mode may, for example, receive data on sub-carrier 2, sub-carrier 3, sub-carrier 4, and sub-carrier 5 on every symbol interval or frame time, depending on the scheduling grant from the base station. A second subscriber station operating in a scheduled (or non-hopping) sub-carrier operational mode may receive data on sub-carrier 7, sub-carrier 8, sub-carrier 9, and sub-carrier 10 on every symbol interval. A third subscriber station operating in a hopping sub-carrier operational mode may receive data during a first symbol interval on sub-carrier 1, during a second symbol interval on sub-carrier 6, during a third symbol interval on sub-carrier 11, during a fourth symbol interval on sub-carrier 1 again, and so forth, hopping from one sub-carrier to another sub-carrier on each successive symbol interval.

The base station, for example base station 104, may communicate with the first, second, and third subscriber stations during the first symbol interval by, for example, transmitting data to the first subscriber station on sub-carriers 2, 3, 4, and 5; to the second subscriber station on sub-carriers 7, 8, 9, and 10; and to the third subscriber station on sub-carrier 1. During a second symbol interval, the base station may transmit data to the first subscriber station on sub-carriers 2, 3, 4, and 5; to the second subscriber station on sub-carriers 7, 8, 9, and 10; and to the third subscriber station on sub-carrier 6. During a third symbol interval, the base station may transmit data to the first subscriber station on sub-carriers 2, 3, 4, and 5; to the second subscriber station on sub-carriers 7, 8, 9, and 10; and to the third subscriber station on sub-carrier 11. During a fourth symbol interval, the base station may transmit data to the first subscriber station on sub-carriers 2, 3, 4, and 5; to the second subscriber station on sub-carriers 7, 8, 9, and 10; and to the third subscriber station on sub-carrier 1 again. As will be discussed in greater detail hereinafter, in an embodiment, the data to be transmitted from the base station, for example base station 104, to the subscriber stations may be mapped to appropriate sub-carriers or tones by a mapping component after data for each of subscriber stations 112-122 is encoded and/or modulated and then the mapping component may output the plurality of modulated characters to an inverse fast Fourier transformer for transforming the tones into the time domain. It is noted that it is also possible to transmit data to any subscriber station on any number of sub-carriers at any symbol interval. But this set of subcarriers may be changed in the next symbol interval, or after a number of symbol intervals. The base station informs the hopping subscriber station about the hopping sequences and hopping rate before transmitting data to the hopping subscriber station.

In any symbol interval the base station may transmit across the whole channel of sub-carriers, for example sub-carrier 1 through sub-carrier 11, but the sub-carriers on which the base station transmits data to the third subscriber station, that is operating in hopping sub-carrier mode or status, can be different on each subsequent symbol interval. The base station schedules the data transmission to the first subscriber station via a set of contiguous sub-carriers during each symbol interval and to the second subscriber station via a different set of contiguous sub-carriers during each symbol interval because the first and second subscriber stations are operating in sub-band scheduling mode. This technique of wireless communication combines access techniques associated with frequency hopping and sub-band scheduling techniques of conventional OFDM, which may be referred to as a hybrid access method and system.

The hopping sub-carrier mode of operation may be desirable for a subscriber station that is relatively far away from the base station and experiencing interference from neighboring cells or that is moving fast within the cell served by the base station, for example base station 104, and is experiencing rapid channel fading conditions. In the hopping sub-carrier mode of operation the transmission data rate from the base station to the subscriber station may be decreased. The sub-carrier scheduling mode of operation may be desirable for a subscriber station that is relatively close to the base station and hence largely free of interference from neighboring cells and moving slowly or stationary and hence experiencing slow channel fading conditions. In the sub-carrier scheduling mode of operation the transmission data rate from the base station to the subscriber station may be increased. As the environment of a subscriber station changes, the base station may change the status of the subscriber from sub-carrier scheduling status to hopping sub-carrier status or from hopping sub-carrier status to sub-carrier scheduling status, which may be referred to as a dynamic hybrid access method and system. The changing communication environment may be determined or estimated based on indications of channel quality sent from the subscriber stations to the base station.

Dotted lines show the approximate extents of the coverage areas 110 and 124, which are shown as approximately circular for the purposes of illustration and explanation only. It should be understood that the coverage areas associated with base stations, for example, coverage areas 110 and 124 associated with base station 104 and base station 106, may have other shapes, including an irregular shape, depending upon the configuration of the base stations and the radio environment that may depend upon natural and man-made obstructions. Additionally, the coverage areas associated with base stations are not constant over time and may be dynamic (expanding or contracting or changing shape) based on changing transmission power levels of the base station and/or the SSs, weather conditions, and other factors. In an embodiment, the radius of the coverage areas of the base stations, for example, the coverage areas 110 and 124 of the base stations 104 and 106, may extend in the range from less than 2 kilometers to about fifty kilometers from the base stations.

As is well known in the art, a base station, such as base station 102, 104, or 106, may employ directional antennas to support a plurality of sectors within the coverage area. While in FIG. 1 the base stations 104 and 106 are depicted approximately in the center of their associated coverage areas 110 and 124, in other embodiments use of directional antennas may locate the base station near the edge of the coverage area, for example, at the point of a cone-shaped or pear-shaped coverage area.

The connection to the Internet 108 from the base station 102 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to the Internet 108 may be provided by different network nodes and equipment.

According to an embodiment of the present disclosure, base stations 104 and 106 of wireless network 100 are each operable to allocate a set of sub-carriers to be used for sub-carrier hopping and are each also operable to determine dynamically whether an SS 112-122 should be given a sub-carrier scheduling status and allocated a sub-channel for communication or should be given a hopping sub-carrier status and assigned a hopping sequence and hopping rate for sub-carrier hopping. In this way, resources may be more optimally shared with minimal interference. In this context, dynamically includes the sense that the sub-carrier status of each subscriber station is determined repeatedly and the set of subcarriers used for transmitting to a subscriber station in the subcarrier scheduling status is changed as often as the sub-carrier status changes. On the other hand, the subscriber station status may change between hopping and non-hopping depending on whether the reported C/I and its rate of change can meet the condition for hopping or non-hopping.

FIG. 2A illustrates base station 104 in greater detail according to an embodiment of the present disclosure. Base station 104 is illustrated by way of example only. However, it will be understood that the components illustrated and described with respect to base station 104 are also part of base stations 102 and 106. According to one embodiment, base station 104 comprises controller 225, channel controller 235 (which may comprise at least one channel element 240), transceiver interface (IF) 245, radio frequency (RF) transceiver unit 250, antenna array 255, hopping sub-carrier allocator 260, sub-carrier status selector 265, sub-channel allocator 270, and hopping sequence assigner 275.

Controller 225 may comprise processing circuitry and memory capable of executing an operating program that controls the overall operation of base station 104. In an embodiment, the controller 225 may be operable to communicate with the Internet 108. Under normal conditions, controller 225 directs the operation of channel controller 235, which may comprise a number of channel elements, such as channel element 240, that are each operable to perform bidirectional communication in the forward channel and the reverse channel. A "forward channel" refers to outbound signals from the base station 104 to SSs 112-122 and a "reverse channel" refers to inbound signals from SSs 112-122 to base station 104. Transceiver IF 245 transfers bidirectional channel signals between channel controller 235 and RF transceiver unit 250.

Antenna array 255 transmits forward channel signals received from RF transceiver unit 250 to subscriber stations 112-122 in the coverage area of base station 104. Antenna array 255 is also operable to send to RF transceiver unit 250 reverse channel signals received from subscriber stations 112-122 in the coverage area of the base station 104. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

Although illustrated separately, it will be understood that any or all of hopping sub-carrier allocator 260, sub-carrier status selector 265, sub-channel allocator 270, and hopping sequence assigner 275 may be implemented together in a single application or control device without departing from the scope of the present disclosure.

Base station 104 is operable to determine parameters for its coverage area, such as FFT size, tone spacing, number of guard tones, guard interval, and length of cyclic prefix. Based on the size of the Fast Fourier Transform (FFT) and the number of sub-carriers that can be used for pilot or data, hopping sub-carrier allocator 260 of base station 104 is operable to select a set of sub-carriers to be used for sub-carrier hopping. For one embodiment, hopping sub-carrier allocator 260 is operable to select sub-carriers for use in sub-carrier hopping that are regularly spaced from each other. Thus, for this embodiment, hopping sub-carrier allocator 260 is operable to allocate every Nth sub-carrier to the hopping sub-carrier set. It may be desirable to space out all hopping sub-carriers about as much as possible to minimize the probability of a single notch interference affecting two adjacent hopping sub-carriers. Hopping sub-carrier allocator 260 is operable to determine the value of N based on the number of SSs 112-122 in the coverage area of base station 104, the amount of interference and/or any other suitable indicators of a need for hopping sub-carriers.

As described in more detail below, the remaining set of sub-carriers that are not used for sub-carrier hopping may then be allocated by sub-channel allocator 270 to subscriber stations 112, 114, 116, 118, 120 and 122 through the formation of sub-channels with various numbers of sub-carriers, either in aggregated or distributed structure.

Subscriber stations that are allocated a hopping sequence and hopping rate use the hopping sub-carriers during different time slots, in accordance with the hopping sequence assigned by hopping sequence assigner 275. Hopping sequence assigner 275 may assign any suitable hopping sequences to hopping subscriber stations. For one embodiment, hopping sequence assigner 275 of base station 104 will assign different patterns for hopping from other base stations in wireless network 100 to ensure that the interference is independent for each base station.

For one embodiment, hopping sequence assigner 275 is operable to support at least two modes of sub-carrier hopping: fast sub-carrier hopping and slow sub-carrier hopping. However, it will be understood that hopping sequence assigner 275 may support any suitable number of sub-carrier hopping modes. For fast sub-carrier hopping, a modulated data symbol is transmitted over multiple hops of the hopping sub-carrier set. This mode reduces the probability of interference to the received data symbol as the number of hopped sub-carriers increases. The signal-to-noise ratio accumulated over the data symbol duration will not be significantly reduced when only a small fraction of the sub-carriers are interfered. For slow sub-carrier hopping, a few data symbols may be transmitted using the same sub-carrier before the data transmission to a subscriber station hops to the next sub-carrier. Higher data rate may be achieved and the complexity of receiver implementation may be slightly lower for this mode as compared to fast sub-carrier hopping. However, the interference resilience of this mode may be insufficient in an environment with high interference power.

Sub-channel allocator 270 is operable to create sub-channels for subscriber stations 112, 114, 116, 118, 120 and 122 in the sub-carrier scheduling mode by grouping the sub-carriers that are not included in the set of hopping sub-carriers. Sub-channel allocator 270 may be operable to create the sub-channels using an aggregated structure in which adjacent sub-carriers are included in the same sub-channel. Alternatively, sub-channel allocator 270 may create the sub-channels using a distributed structure, in which sub-carriers are distributed across the set of non-hopping sub-carriers and the sub-carriers of different sub-channels are interleaved, or using any suitable combination of these structures.

Sub-carrier status selector 265 is operable to determine dynamically the sub-carrier status of a particular subscriber station (i.e., whether a particular one of subscriber stations 112, 114, 116, 118, 120 and 122 is to be a hopping subscriber station or a non-hopping subscriber station). For one embodiment, sub-carrier status selector 265 is operable to make this determination based on a carrier-to-interference (C/I) ratio measured by the subscriber stations 112, 114, 116, 118, 120 and 122 and based on a rate of change for the C/I ratio. It will be understood that a C/I ratio may comprise one or more C/I ratio values. For example, the C/I ratio used to determine a sub-carrier status may be based on 128 C/I ratio values, with one C/I ratio value for each of 128 sub-carriers, or based on any other suitable number of C/I ratio values.

In an embodiment, the subscriber stations may provide measured values of the C/I ratios to the base station, and the base station may calculate the C/I ratio rates of change based on the C/I ratios. Alternatively, the subscriber stations may provide information that may be used by the base station to estimate the C/I ratios, for example the coefficients of a N-th order polynomial approximating the C/I ratios for each of a plurality of sub-carriers measured by a subscriber station. The subscriber stations may provide a single C/I ratio that represents an average of the plurality of measured C/I ratios or a worst case C/I ratio, for example a lowest C/I ratio. For further details about subscriber stations providing C/I ratio and C/I ratio rate of change indications to the base station and the base station estimating subscriber station C/I ratio and C/I ratio rate of change based on these indications see U.S. patent application Ser. No. 12/267,685, filed concurrently herewith, and entitled "Apparatus and Method For Feedback of Sub-carrier Quality Estimation in an OFDM/OFDMA System," which is incorporated herein for reference for all purposes. Estimated and measured C/I ratios may be referred to as indications of C/I ratios and the information on indications of C/I ratios sent from the subscriber station to the base station may be referred to as an indicated C/I ratio.

Thus, when one of subscriber stations 112, 114, 116, 118, 120 and 122 with low mobility, for example a subscriber station that is moving slowly and hence has a low C/I ratio rate of change or a low estimated C/I ratio rate of change, is close to the center of cell 110, sub-carrier status selector 265 may determine that the subscriber station is to be a non-hopping sub-carrier subscriber station and sub-channel allocator 270 may allocate a sub-channel for that subscriber station. However, if a subscriber station, such as SS 122, for example, is moving at high speed, as indicated by a high C/I ratio rate of change or a high estimated C/I ratio rate of change or is close to the edge of cell 110, as indicated by low C/I ratios or low estimated C/I ratios, sub-carrier status selector 265 may determine that SS 122 is to be a sub-carrier hopping subscriber station and hopping sequence assigner 275 may assign a sub-carrier hopping sequence and hopping rate to SS 122. Therefore, for example, a subscriber station near the center of cell 110 that has been determined to be a non-hopping sub-carrier subscriber station may become a sub-carrier hopping subscriber station as the subscriber station moves toward the edge of cell 110.

For a particular embodiment, sub-carrier status selector 265 dynamically determines the sub-carrier status of a subscriber station as follows. If C/I>a or d(C/I)/dt<b (where a is a first C/I threshold and b is a first C/I rate of change threshold), then sub-carrier status selector 265 determines that the subscriber station is a non-hopping sub-carrier subscriber station and sub-channel allocator 270 allocates a sub-channel for the subscriber station based on the indications of C/I ratios received from the subscriber station. However, if C/I<a' or d(C/I)/dt>b' (where a' is a second C/I threshold and b' is a second C/I rate of change threshold), then sub-carrier status selector 265 determines that the subscriber station is a sub-carrier hopping subscriber station based on the indications of C/I ratios received from the subscriber station, and hopping sequence assigner 275 assigns a sub-carrier hopping sequence to the subscriber station. In this way, a buffer zone is created between the thresholds a and a' and between the thresholds b and b' such that a subscriber station with C/I feedback near one of the thresholds is not quickly switching between sub-carrier hopping and sub-carrier scheduling status. During initial transmission (e.g., when a subscriber station registers with the network via the base station), the status of the subscriber station is in the scheduling mode, unless the first few C/I feedbacks indicate that it meets the hopping status.

FIG. 2B is a block diagram of one embodiment of a transmitter portion of a base station, for example base station 104. Some of the components illustrated in FIG. 2B may be included in one or more of the elements illustrated in FIG. 2A. Data from a first user 280a, data from a second user 280b, and data from an N-th user 280c are depicted as inputs to an encoder 282. While three data inputs are depicted, it is understood that any number of data inputs associated with subscriber stations in the coverage area 110 of the base station 104 may be provided to the encoder 282.

The encoder 282 encodes the separate data streams employing techniques well-known in the wireless communications art. The encoder 282 outputs the encoded separate data streams to a modulator 284. The modulator 284 modulates each of the encoded separate data streams as a sequence of symbols employing any of several well-known modulation techniques, for example 16 quadrature amplitude modulation (16 QAM) or quadrature phase shift keying (QPSK). The separate modulated data streams are output to a mapper component 286 that maps each separate modulated data stream to either one or more tones associated with a sub-channel or to the appropriate sub-carrier hopping tone. The mapper 286 outputs a set of tones to an inverse fast Fourier transformer (IFFT) 288 that transforms the assembled tones to a time domain signal.

After a cyclic prefix is inserted by a cyclic prefix insertion block (not shown), the time domain signal is serialized, up-converted by an up-converter (UC) 290, amplified by a radio-frequency amplifier (RF) 292, and transmitted on antenna array 255. The mapper component 286 is controlled by the controller 225 so as to map separate data streams to appropriate sub-channel tones and sub-carrier hopping tones on each subsequent symbol interval and to remap data streams associated with a subscriber station from sub-carrier hopping to non-hopping sub-carrier mode and from non-hopping sub-carrier to sub-carrier hopping mode as directed by the controller 225.

In other embodiments, the encoder 282 may be implemented as a number of separate components, one component per user data stream. In other embodiments, the modulator 284 may be implemented as a number of separate components, one component per user data stream. In an embodiment, the encoder 282 and the modulator 284 may be combined in a single component. In an embodiment, there may be no encoder 282 provided.

While the discussions above have described the forward link from the base station (e.g., BS 104) to the subscriber station (e.g., SS 122), one skilled in the art will readily appreciate that the same dynamic hybrid multiple access techniques may be employed for communication on the reverse link from the subscriber station to the base station. In the case of the reverse link, it may be desirable to synchronize transmissions by subscriber stations so their transmissions arrive at the base station substantially at the same time.

FIG. 3 is a flow diagram illustrating a method 300 for dynamically implementing sub-carrier hopping according to an embodiment of the present disclosure. For the purposes of simplicity and clarity in explaining the operation of the present disclosure, it shall be assumed in the following example that base station 104 of wireless network 100 is providing sub-carrier hopping for a plurality of subscriber stations 112, 114, 116, 118, 120 and 122. However, the description that follows also applies to the remaining base stations in wireless network 100. Additionally, when the method description refers to C/I ratios and/or C/I ratio rate of change it is to be understood that indications of C/I ratios and indications of C/I ratio rate of change are meant.

Initially, hopping sub-carrier allocator 260 allocates sub-carriers for use in sub-carrier hopping (process step 305). For one embodiment, hopping sub-carrier allocator 260 allocates sub-carriers that are regularly spaced from each other. For this embodiment, hopping sub-carrier allocator 260 determines a value of N based on the number of subscriber stations in the coverage area of base station 104, the number of sub-carriers available for use, the amount of interference and/or any other suitable factors of a need for hopping frequencies and allocates every Nth sub-carrier to the hopping sub-carrier set.

For each subscriber station within the coverage area of base station 104, base station 104 receives a C/I ratio from the subscriber station at a specified rate (process step 310) and calculates a rate of change for the received C/I ratios (process step 315).

Based on the current C/I ratio and the current C/I ratio rate of change, sub-carrier status selector 265 selects a sub-carrier status for the subscriber station (process step 320). For a particular embodiment, sub-carrier status selector 265 selects a non-hopping sub-carrier status when the current C/I ratio is above a first C/I threshold or when the current C/I ratio rate of change is below a first C/I ratio rate of change threshold and selects a hopping sub-carrier status when the current C/I ratio is below a second C/I threshold or when the current C/I ratio rate of change is above a second C/I ratio rate of change threshold.

When sub-carrier status selector 265 has selected a non-hopping sub-carrier status for the subscriber station (process step 325), sub-channel allocator 270 allocates at least one sub-channel for the subscriber station (process step 330). However, when sub-carrier status selector 265 has selected a hopping sub-carrier status for the subscriber station (process step 325), hopping sequence assigner 275 assigns a hopping sequence and hopping rate to the subscriber station (process step 335).

Even after the subscriber station has been allocated a sub-channel (process step 330) or assigned a hopping sequence and hopping rate (process step 335), base station 104 continues to receive C/I ratios from the subscriber station at the specified rate (process step 310) and continues to calculate a rate of change for the received C/I ratios (process step 315) such that sub-carrier status selector 265 may dynamically update the sub-carrier status for the subscriber station if conditions change (process step 320).

Although the above description focuses on data transmissions in the downlink (i.e., from the base station to the subscriber station), the hybrid multiple access method disclosed herein is equally applicable to uplink transmissions (i.e., from the subscriber station to the base station). In a system where channel reciprocity exists (i.e., C/I information in the downlink is approximately the same as C/I information in the uplink), the base station may determine that the hopping or non-hopping status of the subscriber station is the same for both the downlink and the uplink. However, the size of sub-channel allocation need not be the same.

In a system in which channel reciprocity does not exist, the hopping or non-hopping status of the subscriber station may be different in the downlink and the uplink. In such a case, the base station may determine the status of the subscriber station in the uplink by direct estimation of the channel quality, or C/I ratio based on transmissions from the subscriber station, without using feedback from the subscriber station. In addition, the hopping sub-carrier sequence or hopping rate may be different for the uplink.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of dynamic hybrid multiple access for a plurality of subscriber stations, the method comprising:

selecting a sub-carrier status for a subscriber station for at least one of downlink transmissions and uplink transmissions based on at least one predetermined condition for the subscriber station, the sub-carrier status comprising one of hopping and non-hopping;

monitoring the predetermined condition for the subscriber station repeatedly while the subscriber station is in a coverage area of a base station to determine whether to switch the sub-carrier status for the subscriber station based on a change in the predetermined condition;

allocating at least one sub-channel to a non-hopping subscriber station, each sub-channel created with a set of subcarriers, wherein the set of subcarriers is determined when the subcarrier status of the subscriber station is switched from hopping to non-hopping; and assigning one of a plurality of hopping sequences to a hopping subscriber station, wherein the plurality of hopping sequences differs from hopping sequences in adjacent base stations to reduce inter-cell interference.

2. The method as set forth in claim 1, the at least one predetermined condition comprising an indicated carrier-to-interference (C/I) ratio and a rate of change for the indicated C/I ratio.

3. The method as set forth in claim 2, selecting the sub-carrier status for the subscriber station based on the predetermined condition comprising:

selecting non-hopping for the subscriber station when one of (i) the indicated C/I ratio of the subscriber station is greater than a first C/I threshold and (ii) the rate of change for the indicated C/I ratio of the subscriber station is less than a first C/I rate of change threshold; and selecting hopping for the subscriber station when one of (i) the indicated C/I ratio of the subscriber station is less than a second C/I threshold and (ii) a rate of change for the indicated C/I ratio of the subscriber station is greater than a second C/I rate of change threshold.

4. The method as set forth in claim 2, further comprising:
receiving from the subscriber station indications of a plurality of C/I ratios at a specified rate, the indicated C/I ratios based on at least one of measurements and estimations of the C/I ratios; and calculating the rate of change for the indicated C/I ratios based on the received indications of C/I ratios.

5. The method as set forth in claim 1, further comprising creating the sub-channels using an aggregated structure, wherein the sub-carriers of a sub-channel are all adjacent to other sub-carriers of the sub-channel.

6. The method as set forth in claim 1, further comprising creating the sub-channels using a distributed structure, wherein some of the sub-carriers of a first sub-channel are interleaved with sub-carriers of at least a second sub-channel.

7. The method as set forth in claim 1, selecting the sub-carrier status for the subscriber station for at least one of downlink transmissions and uplink transmissions comprising selecting hopping for the subscriber station for downlink transmissions and selecting hopping for the subscriber station for uplink transmissions, the method further comprising:

assigning a downlink hopping sequence and a downlink hopping rate to the subscriber station for downlink transmissions; and assigning an uplink hopping sequence and an uplink hopping rate to the subscriber station for uplink transmissions, the uplink hopping sequence independent of the downlink hopping sequence and the uplink hopping rate independent of the downlink hopping rate.

8. A method of dynamic hybrid multiple access for a plurality of subscriber stations, the method comprising:

allocating a subset of a plurality of sub-carriers for use by hopping subscriber stations in sub-carrier hopping, a remaining subset of the sub-carriers available for use by non-hopping subscriber stations;

creating a plurality of sub-channels by grouping the remaining subset of sub-carriers into the sub-channels;

dynamically selecting a sub-carrier status for each of the subscriber stations based on at least one predetermined condition for the subscriber station, the sub-carrier status comprising one of hopping and non-hopping, the at least one predetermined condition monitored repeatedly while the subscriber station is in a coverage area of a base station;

allocating at least one of the sub-channels to each non-hopping subscriber station, each sub-channel created with a set of subcarriers, wherein the set of subcarriers is determined when the subcarrier status of the subscriber station is switched from hopping to non-hopping; and assigning one of a plurality of hopping sequences to a hopping subscriber station, wherein the plurality of hopping sequences differs from hopping sequences in adjacent base stations to reduce inter-cell interference.

9. The method as set forth in claim 8, allocating the subset of sub-carriers comprising allocating the subset of sub-carriers at a regular spacing from each other.

10. The method as set forth in claim 9, further comprising determining a distance for the regular spacing based on hopping sub-carrier indicators.

11. The method as set forth in claim 10, the hopping sub-carrier indicators comprising at least one of a number of subscriber stations in the coverage area of a base station in the wireless network and an amount of interference in the coverage area of the base station.

12. The method as set forth in claim 8, the at least one predetermined condition comprising an indicated carrier-to-interference (C/I) ratio and a rate of change for the indicated C/I ratio.

13. The method as set forth in claim 12, dynamically selecting the sub-carrier status for each of the subscriber stations based on the predetermined condition comprising:

selecting non-hopping for a subscriber station when one of (i) the indicated C/I ratio of the subscriber station is greater than a first C/I threshold and (ii) the rate of change for the indicated C/I ratio of the subscriber station is less than a first C/I rate of change threshold; and selecting hopping for a subscriber station when one of (i) the indicated C/I ratio of the subscriber station is less than a second C/I threshold and (ii) the rate of change for the indicated C/I ratio of the subscriber station is greater than a second C/I rate of change threshold.

14. The method as set forth in claim 12, further comprising:

receiving from each subscriber station indications of a plurality of C/I ratios at a specified rate, the indicated C/I ratios based on at least one of measurements and estimations of the C/I ratios; and calculating the rate of change for the indicated C/I ratios based on the received indications of C/I ratios.

15. A base station capable of dynamic hybrid multiple access for a plurality of subscriber stations in a coverage area of the base station, the base station comprising:

a sub-carrier status selector configured to select a sub-carrier status for each of the subscriber stations for at least one of downlink transmissions and uplink transmissions based on at least one predetermined condition for the subscriber station, the sub-carrier status comprising one of hopping and non-hopping, and to monitor the predetermined condition for each subscriber station repeatedly while the subscriber station is in a coverage area of a base station to determine whether to switch the sub-carrier status for the subscriber station based on a change in the predetermined condition;

a sub-channel allocator configured to allocate at least one sub-channel to each non-hopping subscriber station, each sub-channel created with a set of subcarriers, wherein the set of subcarriers is determined when the subcarrier status of the subscriber station is switched from hopping to non-hopping;

a hopping sequence assigner configured to assign a hopping sequence to each hopping subscriber station, wherein the plurality of hopping sequences differs from hopping sequences in adjacent base stations to reduce inter-cell interference;

a mapper component configured to assign a modulated symbol to be transmitted to a first subscriber station to a hopping sub-carrier and to assign a modulated character to be transmitted to a second subscriber station to a non-hopping sub-carrier, the first subscriber station being selected for hopping sub-carrier status and the second subscriber station being selected for scheduled sub-carrier status; and an inverse fast Fourier transformer configured to receive outputs from the mapper component for at least the hopping sub-carrier and the non-hopping sub-carrier and to transform the modulated symbols associated with the hopping and non-hopping sub-carriers to a portion of a time domain orthogonal frequency division multiplexing symbol.

16. The base station as set forth in claim 15, the at least one predetermined condition comprising an indicated carrier-to-interference (C/I) ratio and a rate of change for the indicated C/I ratio.

17. The base station as set forth in claim 16, the sub-carrier status selector configured to select the sub-carrier status for a subscriber station by selecting a non-hopping sub-carrier status for the subscriber station when one of (i) the indicated C/I ratio of the subscriber station is greater than a first C/I threshold and (ii) the rate of change for the indicated C/I ratio of the subscriber station is less than a first C/I rate of change threshold and by selecting a hopping sub-carrier status for the subscriber station when one of (i) the indicated C/I ratio of the subscriber station is less than a second C/I threshold and (ii) the rate of change for the indicated C/I ratio of the subscriber station is greater than a second C/I rate of change threshold.

18. The base station as set forth in claim 15, further comprising a hopping sub-carrier allocator configured to allocate a subset of a plurality of sub-carriers for use by hopping subscriber stations in sub-carrier hopping, a remaining subset of the sub-carriers available for use by non-hopping subscriber stations, and the sub-channel allocator further configured to create a plurality of sub-channels by grouping the remaining subset of sub-carriers into the sub-channels.

19. The base station as set forth in claim 18, the hopping sub-carrier allocator configured to allocate the subset of sub-carriers at a regular spacing from each other.

20. The base station as set forth in claim 19, the hopping sub-carrier allocator further configured to determine a distance for the regular spacing based on at least one of a number of subscriber stations in the coverage area of the base station and an amount of interference in the coverage area of the base station.

21. The base station as set forth in claim 15, the hopping sequence assigner further configured to assign a downlink hopping sequence and a downlink hopping rate to a specified hopping subscriber station for downlink transmissions and to assign an uplink hopping sequence and an uplink hopping rate to the specified hopping subscriber station for uplink transmissions, the uplink hopping sequence independent of the downlink hopping sequence and the uplink hopping rate independent of the downlink hopping rate.

22. The base station as set forth in claim 15, where the hopping sequence is one of a plurality of hopping sequences, and wherein the plurality of hopping sequences differs from hopping sequences in adjacent base stations to reduce inter-cell interference.

* * * * *